United States Patent [19]
Harriman, Jr.

[11] Patent Number: 5,398,245
[45] Date of Patent: Mar. 14, 1995

[54] PACKET PROCESSING METHOD AND APPARATUS

[75] Inventor: Edward S. Harriman, Jr., Billerica, Mass.

[73] Assignee: Bay Networks, Inc., Billerica, Mass.

[21] Appl. No.: 771,769

[22] Filed: Oct. 4, 1991

[51] Int. Cl.⁶ .............................................. H04J 3/24
[52] U.S. Cl. ................................ 370/94.1; 370/110.1
[58] Field of Search ...................... 370/94.1, 60, 60.1, 370/58.1, 58.2, 58.3, 110.1

[56] References Cited

U.S. PATENT DOCUMENTS

| | | | |
|---|---|---|---|
| 4,910,731 | 3/1990 | Sakurai et al. | 370/67 |
| 4,937,814 | 6/1990 | Weldink | 370/94.1 |
| 4,947,388 | 8/1990 | Kuwahara et al. | 370/60 |
| 4,969,149 | 11/1990 | Killat et al. | 370/94.1 |
| 5,062,106 | 10/1991 | Yamazaki et al. | 370/85.6 |
| 5,101,402 | 3/1992 | Chiu et al. | 370/94.1 |
| 5,130,977 | 7/1992 | May et al. | 370/60 |
| 5,140,582 | 8/1992 | Tsuboi et al. | 370/94.1 |
| 5,140,583 | 8/1992 | May et al. | 370/94.1 |

*Primary Examiner*—Douglas W. Olms
*Assistant Examiner*—Dang Ton
*Attorney, Agent, or Firm*—Fish & Richardson

[57] ABSTRACT

A method and apparatus for processing a data packet, for delivery to a designated location, store selective portions of the packet header in a high speed cache memory to increase processing speed and hence throughput for a packet delivery system. The apparatus and method receive the packets from a data channel source and store portions of the header in cache, and at least the remainder of each data packet is stored in a slower speed memory. A CPU accesses the stored header portion of each packet in cache for necessary protocol and destination information processing of the data packet. The header portions are then overwritten with new data and combined with the remainder of the data packet stored in slower speed memory for transmission to the next packet destination. Preferably, the address at which the remainder portions are stored in slower speed memory determine the cache addresses at which the header portion is stored in high speed cache memory.

14 Claims, 2 Drawing Sheets

PACKET PROCESSING METHOD AND APPARATUS

BACKGROUND OF THE INVENTION

The invention relates generally to a method and apparatus for data communications; and more particularly, to a method and apparatus for processing and transferring data packets in a bridge or router circuit.

As networks have increased substantially in throughput during the recent few years, so that a standard FDDI network now operates at one hundred megabits per second, a potential bottleneck occurs when data packets need to be transmitted between two networks, for example, using a bridge or router circuitry. The circuitry must be fast enough not only to simply forward the data packet, but in addition to process the data packet headers so that a new header, identifying, for example, the next routing destination, can be generated and prepended to the packet data. The resulting "strain" on a bridge or router CPU, and the controlling software, can be substantial. In particular, since the data packet is typically stored in DRAM memory, the constant accesses to the stored packet by the CPU for certain required information can prove to be a bottleneck in the system. One obvious solution to the bottleneck issue is to store the entire data packet in high speed static memory. This poses significant cost problems since high speed static memory is relatively expensive; and accordingly, a large capacity memory, able to store many data packets, becomes the major cost expense for a product.

It is therefore an object of the invention to increase the throughput processing of data packets without incurring substantially increased memory costs, while maintaining high system reliability. Another object of the invention is high speed access to the data packet information.

SUMMARY OF THE INVENTION

The invention thus relates to a method and apparatus for processing a data packet for delivery to a designated location, the packet having a selected protocol wherein a header of the packet includes at least one of destination identification data, protocol data, and source identification data. The method of the invention features the steps of receiving successive packets from a data source channel, storing at least a portion of the header of each packet in a high speed data cache, storing at least the remainder of each data packet (and preferably the entire data packet) in a slower speed memory, accessing each header portion of each packet in the high speed data cache for protocol and the destination processing of the data packet, and forwarding a newly generated data packet to a next packet destination.

The method further features the steps of storing each header portion of the data packet at an address which is identified by the location in the slower memory of the remainder of the associated data packet.

The apparatus of the invention features circuitry for receiving successive packets from the data source channel, a high speed data cache and a slower speed memory, circuitry for storing at least a header portion of each packet in the high speed data cache and for storing at least the remainder (and preferably all) of each packet in the slower speed mass memory, circuitry for accessing each header portion of each packet in the data cache for protocol and destination processing of the data packet, and circuitry for forwarding a generated new data packet to a next packet destination.

The apparatus further features circuitry for storing each header portion of a data packet at an address which is identified by the location in slow memory of the remaining portion of the associated data packet.

BRIEF DESCRIPTION OF THE DRAWINGS

Other objects, features, and advantages of the invention will be apparent from the following description taken together with the drawings in which.

DESCRIPTION OF A PREFERRED EMBODIMENT

Figure 1:
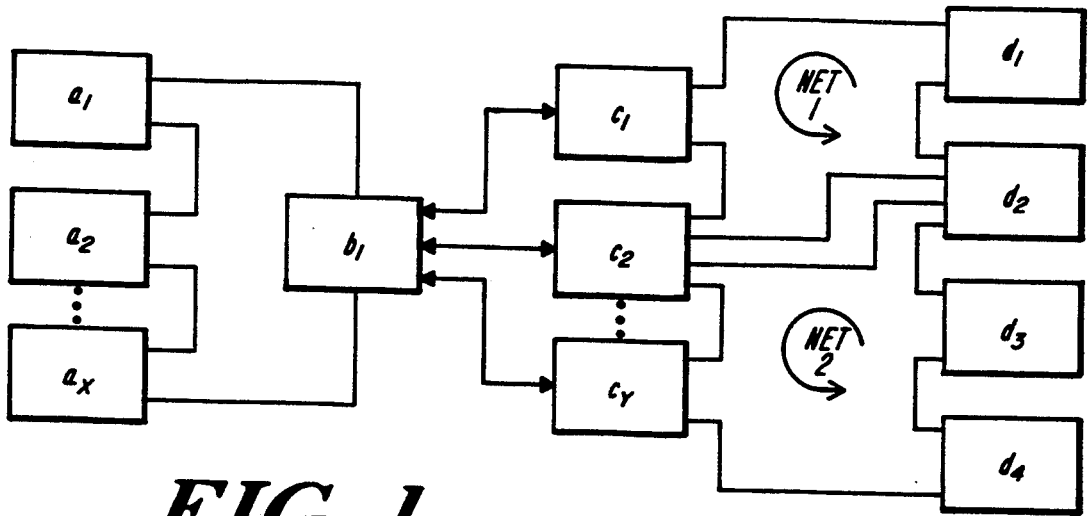
FIG. 1 is a block diagram of a system for delivering packets between nodes in a network.

Referring to FIG. 1, a data packet networking system 10 includes a plurality of nodes $A_1, A_1, \ldots A_x, D_1, D_2, \ldots, D_z$ which are interconnected with each other through routing or bridge circuitries $B_1, C_1, C_2, \ldots C_y$. The routing and bridge circuitries receive data from the nodes and transfer that data either to other nodes or to other bridges and routers on the way to a final destination node. In typical operation, the bridge and routing circuitry are programmed with the configuration of the network and accordingly know the available paths for forwarding data to the final destination.

Figure 2:
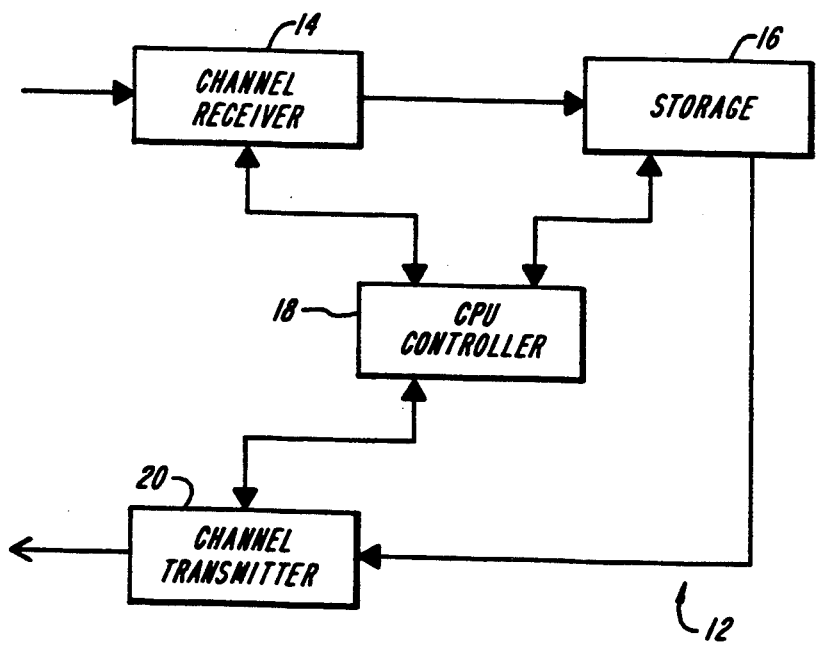
FIG. 2 is a more detailed block diagram of a router or bridge circuit for the apparatus illustrated in FIG. 1.

In typical operation, referring to FIG. 2, a router or bridge circuitry 12 receives data over a channel receiver 14. The channel receiver operates to store the data packet in a storage memory 16 while at the same time advising a controller 18 of the arrival of the packet. The controller can receive, for example, the entire data packet to determine its structure. The structure typically includes a header at the beginning of the data packet, the data itself, and an error check (typically a CRC error check) at the end of the data packet by which the receiver can check the integrity of the data which is being received. The controller, after examining the header, can also determine the protocol being used, if more than one protocol is available over the input channel, and the eventual destination and source node for the data packet. The CPU operates to generate a new header for the data, appends the new header to the remaining portion of the data packet and directs the now reconstructed header and data combination out over a channel transmitter 20 onto another network for transmission to the final node or to the next router/bridge along its path. An error check word is calculated in the transmitter and is appended to the end of the data packet.

Figure 3:
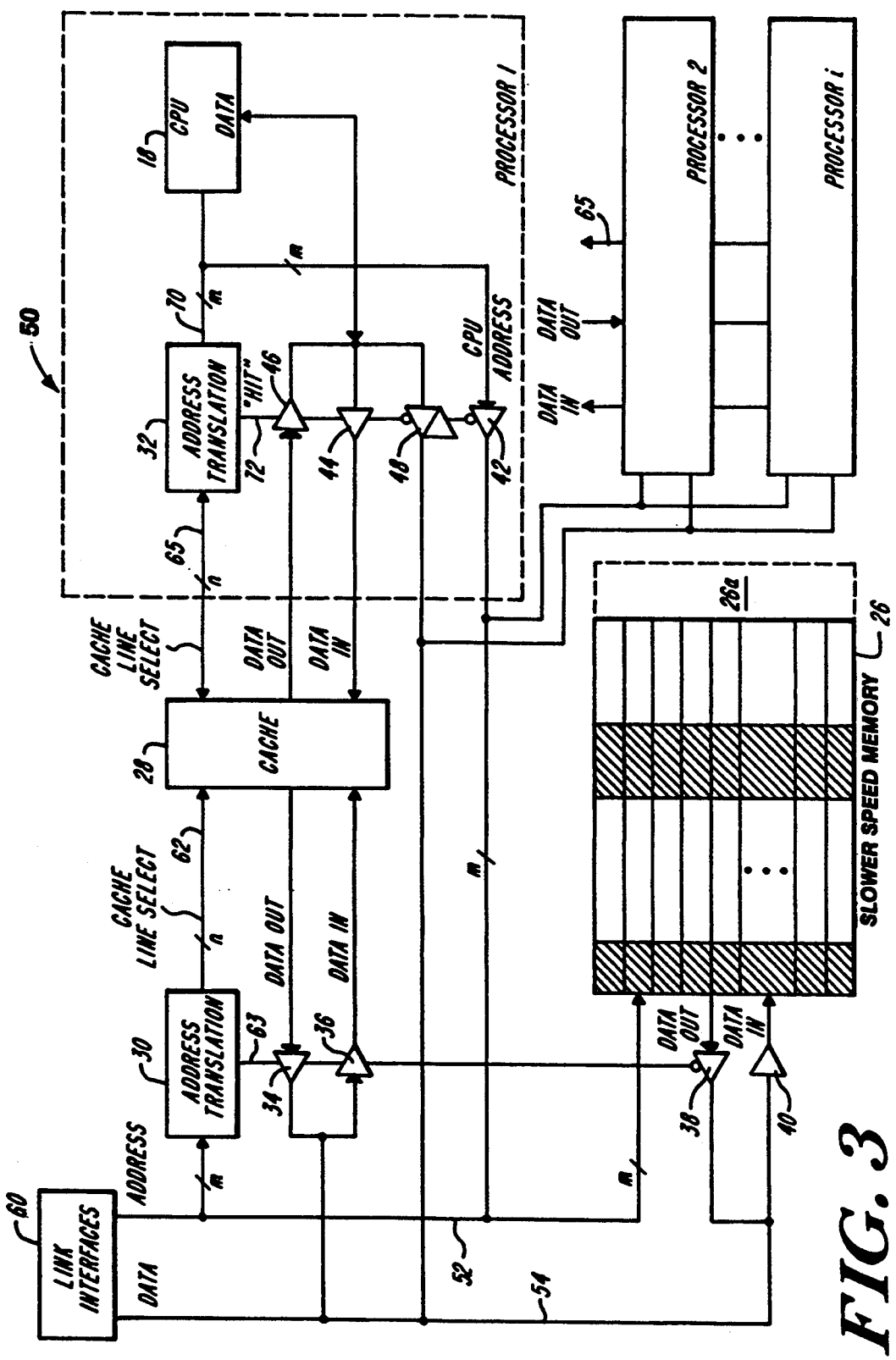
FIG. 3 illustrates in a more detail, the portion of the router or bridge to which the invention is directed.

The present invention is directed to a more efficient method and apparatus for handling the data packet processing in the router/bridge circuit. Referring to FIG. 3, in accordance with the illustrated embodiment of the invention, the router includes a slower memory circuitry 26, a high speed cache memory 28, the CPU controller 18, address translation and control circuitries 30 and 32, and controllable driver circuitries 34, 36, 38, 40, 42, 44, 46, and 48. All of the drivers are unidirectional except for the bidirectional driver circuitry 48.

CPU 18, address and control circuitry 32, and drivers 42, 44, 46, and 48 form a processing element 50, which connects to the input/output address and bus lines 52 and 54 respectively and to the data cache 28. It is expected that in a preferred embodiment of the invention, there can be a plurality of processing elements; and that each of the processing elements 50 can operate upon a different data packet, in parallel, with the data cache 28 being fast enough to service, simultaneously, all of the processing elements 50.

In operation, the address translation and control circuits 30, 32 are preset by the CPU 18 to recognize, using the lower order bits on the address line, the bytes of information in the packet which are to be stored, according to the protocol used, in the cache memory 28. The stored bytes need not be adjacent to each other in the packet, but will all belong to the packet header, in the illustrated embodiment. Address and control circuit 30, during packet reception, receives address data from link interfaces 60 over address bus lines 52. The address data is also provided to the slower memory 26. The address is translated using a stored memory array table in a random access memory of the address translation circuitry 30 and a corresponding cache line select address, based upon a high order portion of the address is output over lines 62 to the multiported cache memory 28. Correspondingly, the data drivers 36 are selectively enabled, depending upon the low order portion of the address (as described below), and cause that portion of the incoming data packet which is to be stored in cache to be loaded into the cache memory at the line address specified over lines 62.

Simultaneously, the entire data packet, in the illustrated embodiment, is also stored in buffer memory 26 through drivers 40 at an address corresponding to the address available over the input/output lines 52. The data packet information is available over lines 54 and the packet is stored in its entirety in buffer memory 26. Buffer memory 26 also includes sufficient control circuitry at 26a for decoding the address information over lines 52 and receiving and storing the entire data packet in a buffer assigned to the most significant bits of that data address. The information stored in cache memory 28 includes at least an identification of the source and destination of the data packet, the protocol being used if the protocol is not already known to the bridge/router circuitry, and/or other required header information which will be needed to enable the processor 50 to generate a new header and pass the data packet on to the next receiving node of the network.

Thus, when the data packet is first received, the entire data packet is stored in buffer memory 26, typically a dynamic RAM (DRAM), while selected header data (that which is typically used by the CPU), is stored in fast cache memory 28 and is made available to the CPU as required as follows. The header data is selected using the translate and control circuitry 30 and need not be contiguous in the header. That circuitry, at turn-on, is initialized by the CPU to recognize by the low order bits of the address data, those bytes of the header which are to be "cached". Those bytes need not be contiguous in the data packet. Upon recognition of an address corresponding to header data to be stored, circuitry 30 asserts the "hit" line 63 and places the correct address on data input lines 62. The data is then read by, and stored in, cache 28.

Once the data packet has been received and is properly in both the buffer memory 26 and cache memory 28, any of the processors 50 can access cache 28 to recover the header information contained therein. Thus, the processor 50, through its CPU 18, requests data over lines 70 using an address which corresponds to the address on input/output address lines 52. The address translation circuit 32, like address translation circuit 30, translates that address into a cache select line address over lines 65. If the address is valid and corresponds to data stored in cache, the data drivers 44 or 46 are activated by the "hit" signal over a line 72 and the CPU either reads data from the cache memory for processing or writes data into the cache memory for use as part of a new header for the data packet. Note that if there is no "hit" and the header data is not available in cache, then the CPU will either read the data from buffer memory 26 or write data to buffer memory 26 through data drivers 48 and address drivers 42.

The data cache 28, as seen above, is a multiple port memory. In the preferred embodiment of the invention, the cache is a true multi-port memory; that is, simultaneous reads and/or writes are serviced in parallel, thereby eliminating any performance degradation. In other implementations of the data cache, true N-port memories or multiplexed port memories can be used. Further, multiple caches which are really just a specific implementation of a single large cache can also be implemented. In all of these embodiments, the cache 28 services each of the demands placed upon it, that is, from address translation circuitry 30, or from one of the address translation circuits 32 of a processing element 50. If cache 28 is a multiplexed implementation, and is servicing one of those processing elements 50, any other request is stayed until the earlier, and on-going, request has been serviced. Thereafter, the multiplexed cache memory 28 will service the next received request.

Thus, in operation, the CPU controller causes the header information to be written, typically to cache memory, ("hit" is asserted) through drivers 44, and can also, and alternatively, cause previously written header information to be read from cache memory, through drivers 42, to the CPU. Further, under CPU control, header data can be read from cache memory, through drivers 46 and 48 for access to the data bus 54. The buffer memory 26 also under CPU control, can provide the remainder of data from its memory, over the data output lines, through connected driver 38. At the end of the data packet, the CPU adds, through driver 48, the error check bits so that the receiving node(s) for this packet will have all of the information necessary to check the integrity of the incoming data.

In accordance with the preferred embodiment of the invention, the buffer layout, and therefore the header address, is known to the system and allows the address translation circuitry to be fixed at installation time. The buffer layout also allows all sides of the packet header cache to run independently and enables the cache to anticipate the CPU requirements rather than responding thereto. Further, the use of a multiport memory for cache 28 eliminates bus arbitration overhead and enables, with the use of the address translation circuitry, the use of commercial multiport memories and comparison logic.

Additions, subtractions, and other modifications of the described embodiment will be apparent to those of ordinary skill of the art and are within the scope of the following claims.

What is claimed is:

1. A method for processing a data packet for delivery to a designated destination, said data packet having a selected protocol, said data packet including a header and a remainder portion, wherein said header of said data packet includes at least one of destination identification data, protocol data, and source identification data, comprising the steps of receiving successive data packets from a data source channel, storing at least a portion of said header of each data packet in a high speed data cache memory, storing at least said remainder portion of said each data packet in a slower speed memory, accessing each header of said each data packet in said high speed data cache memory for protocol and destination processing of said each data packet, and forwarding a new data packet to a next data packet destination based on the designated protocol and destination processing of said each data packet.

2. The method of claim 1 further comprising the step of storing said header of said each data packet at an address identifying the location in said slower speed memory of said remainder portion of said each data packet.

3. The method of claim 1 further comprising the step of identifying, from an address in said slower speed memory at which said remainder portion of said each data packet is stored, an address in said high speed data cache memory at which said header is stored.

4. The method of claim 1 further comprising the steps of providing plural port access to said high speed data cache memory from at least an input/output data bus and a CPU based processor, reading said stored header directly from said high speed data cache memory by said processor, and writing to said high speed data cache memory from said processor for modifying said header.

5. The method of claim 1 further comprising the step of storing non-adjacent portions of said header in said high speed data cache memory.

6. The method of claim 1 further comprising the step of selecting portions of said header for storage in said high speed data cache memory depending upon the address in said slower speed memory into which said remainder portion is stored.

7. A method for processing a data packet for delivery to a designated destination, said data packet having a selected protocol and including a header and a remainder portion, wherein the header of said data packet includes at least one of destination identification data, protocol data, and source identification data, comprising the steps of receiving successive data packets from a data source channel, storing non-contiguous portions of the header of each data packet in a high speed data cache memory, storing at least said remainder portion of said each data packet in a slower speed memory, selecting portions of said header of said each data packet for storage in said high speed data cache memory depending upon the address in the slower speed memory into which an associated remainder portion is stored, identifying, from an address in the slower speed memory at which said remainder portion of said each data packet is stored, an address in said high speed data cache memory at which the selected portion corresponding to said associated remainder portion is stored, accessing said header of said each data packet in said high speed data cache memory for protocol and destination processing of said each data packet, said accessing step comprising providing plural port access to said high speed data cache memory from at least an input/output data bus and a CPU based processor, reading said stored header directly from said high speed data cache memory by said processor, and writing to said high speed data cache memory from said processor for modifying said header, and forwarding a new data packet to a next data packet destination based on the designated protocol and destination processing of the data packet.

8. An apparatus for processing a data packet for delivery to a designated destination, said data packet having a selected protocol, said data packet including a header and a remainder portion, wherein the header of said data packet includes at least one of destination identification data, protocol data, and source identification data, comprising means for receiving successive data packets from a data source channel, a high speed data cache memory, a slower speed memory, means for storing at least a portion of said header of each data packet in said high speed data cache memory, means for storing at least said remainder portion of said each data packet in said slower speed memory, means for accessing said header of said each data packet in said high speed data cache memory for protocol and destination processing of the data packet, and means for forwarding a new data packet to a next data packet destination based on the designated protocol and destination processing of said data packet.

9. The apparatus of claim 8 further comprising means for storing each said header portion of a data packet at an address identifying the location in said slower speed memory of the remainder portion of the associated data packet.

10. The apparatus of claim 8 further comprising means for identifying from an address in said slower speed memory at which each said remainder portion of said each data packet is stored, an address in said high speed data cache memory at which said header is stored.

11. The apparatus of claim 8 further comprising means for providing plural port access to said high speed data cache memory from input/output data bus and a CPU based processor, means for reading said stored header directly from said high speed data cache memory by said processor, and means for writing to said high speed data cache memory from said processor for modifying said header.

12. The apparatus of claim 8 further comprising means for storing non-adjacent portions of said header in said high speed data cache memory.

13. The apparatus of claim 8 further comprising means for selecting portions of said header for storage in said high speed data cache memory depending upon the address in slow memory into which said remainder portion is stored.

14. An apparatus for processing a data packet for delivery to a designated destination, said data packet having a selected protocol, said data packet including a header and a remainder portion, wherein the header of said data packet includes at least one of destination identification data, protocol data, and source identification data, comprising means for receiving successive data packets from a data source channel, a multi-port high speed data cache memory, means for connecting said high speed data cache memory to an input/output data bus and a CPU based processor, a slower speed memory, means for storing non-contiguous portions of said header of each data packet in said high speed data cache memory, means for storing at least said remainder portion of said each data packet in said slower speed memory, means for selecting portions of said header for storage in said high speed data cache memory depending upon the address in said slower speed memory into which said remainder portion is stored, means for accessing said header of said each data packet in said high speed data cache memory for protocol and destination processing of said data packet, said accessing means having means for identifying from an address in said slower speed memory at which said remainder portion of said each data packet is stored, an address in said high speed data cache memory at which said header is stored, means for reading said stored header directly from said high speed data cache memory by said processor, and means for writing to said high speed data cache memory from said processor for modifying said header, and means for forwarding a new data packet to a next data packet destination based on the protocol and destination processing of said data packet.

\* \* \* \* \*